United States Patent [19]

Baker et al.

[11] Patent Number: 4,784,865

[45] Date of Patent: Nov. 15, 1988

[54] LOW FAT COFFEE WHITENER AND METHOD FOR MAKING LOW FAT COFFEE WHITENER

[75] Inventors: Donald B. Baker, Tulsa; Vanessa Hulett, Jenks, both of Okla.

[73] Assignee: The Pro-Mark Companies, Tulsa, Okla.

[21] Appl. No.: 863,334

[22] Filed: May 15, 1986

[51] Int. Cl.$^4$ ............................................. A23C 11/00
[52] U.S. Cl. ...................... 426/250; 426/392; 426/580; 426/583; 426/588; 426/602; 426/804
[58] Field of Search ............... 426/583, 587, 588, 613, 426/586, 602, 580, 804, 392, 250

[56] References Cited

U.S. PATENT DOCUMENTS

| | | | |
|---|---|---|---|
| 2,645,579 | 7/1953 | Kempf et al. | 426/330.2 |
| 2,970,913 | 2/1961 | Loewenstein | 426/580 |
| 3,592,940 | 7/1971 | Quesada | 426/98 X |
| 3,995,070 | 11/1976 | Nagasawa et al. | 426/580 |
| 4,012,533 | 3/1977 | Jonas | 426/565 |
| 4,096,287 | 6/1978 | Kemp | 426/588 |
| 4,239,786 | 12/1980 | Gilmore et al. | 426/602 X |
| 4,341,811 | 7/1982 | Rule et al. | 426/602 |
| 4,347,258 | 8/1982 | Merkenich et al. | 426/586 X |
| 4,407,838 | 10/1983 | Rule et al. | 426/602 |
| 4,415,600 | 11/1983 | Miller et al. | 426/613 |
| 4,492,714 | 1/1985 | Cooper et al. | 426/613 X |
| 4,631,196 | 12/1986 | Zeller | 426/580 |

*Primary Examiner*—Steven Weinstein
*Assistant Examiner*—Celine Callahan
*Attorney, Agent, or Firm*—Sixbey, Friedman, Leedom & Ferguson

[57] ABSTRACT

A substantially fat and cholesterol free, low calorie, fluid, dairy coffee whitener comprising, as major ingredients, low fat milk having a butterfat content not exceeding 1.0% by weight, preferably less than about 0.4% by weight, and nonfat dry milk solids, and including an emulsifier, preferably a monodiglyceride, and a whitening agent. The nonfat dry milk solids are preferably of the specially heat modified type and are derived from a process in which condensed skim milk is subjected to non-coagulative direct steam heating prior to spray drying. The resultant coffee whitener has the appearance, taste and mouth feel of conventional high butterfat containing dairy creamers, a total solids content of 18 to 25% by weight, a protein content of 8 to 12% by weight and a calorie content of less than 10 calories per serving.

22 Claims, No Drawings

LOW FAT COFFEE WHITENER AND METHOD FOR MAKING LOW FAT COFFEE WHITENER

TECHNICAL FIELD

The present invention relates generally to dairy-based coffee whiteners and, more particularly, to a low fat, low calorie, low cholesterol, fluid, dairy-baed coffee whiteners and a method for making such a whitener.

BACKGROUND ART

Traditionally, throughout the years, the coffee drinking public has utilized fluid, dairy-based coffee creamers or whiteners to lighten coffee and to neutralize coffee acids for producing a smoother, milder and more mellow coffee drink. Probably the most popular fluid, dairy-based coffee whitener for this purpose has been half & half, a fluid milk product having a butterfat content of not less than 10.5% by weight.

In more recent years, non-dairy coffee whiteners have become of increasing importance in the food industry because of their ease of handling and unrefrigerated shelf stability. Their success has been attributed, in part, to economics by comparison, for example, with the relatively high cost of fluid dairy products and, in part, to the somewhat emotional appeal associated with their freedom from cholesterol due to the absence of butterfat from these non-dairy whiteners. U.S. Pat. Nos. 4,239,786—Gilmore et al, 4,407,838—Rule et al, 4,415,600—Miller et al and 4,341,811—Rule et al disclose typical non-dairy coffee whitener formulations.

Non-dairy coffee whiteners are marketed in three physical forms: powdered, liquid and frozen. Regardless of their physical form most non-dairy coffee whiteners contain the same essential ingredients, namely hydrogenated vegetable fat or oil, carbohydrates, protein, emulsifiers and stabilizing/buffering agents. The absolute level of each of these ingredients in the coffee whitener varies depending on the physical form of the whitener, although the relative proportions of the ingredients remain about the same. As a practical matter dried coffee whitener formulations are the most popular and the ingredient formulation for a typical powdered whitener is given in the table below in which all proportions are in percent by weight:

|  | TYPICAL POWDERED |
| --- | --- |
| Hydrogenated Vegetable Fat or Oil | 35 |
| Carbohydrate (e.g., 24 D.E. corn syrup solids) | 55.25 |
| Protein (e.g., sodium caseinate) | 5.25 |
| Emulsifier (e.g., mono-diglyceride) | 2.5 |
| Stabilizing/Buffering Agents (e.g., $K_2HPO_4$) | 2 |
| Color/Flavor | as needed |

By way of comparison, typical liquid coffee whiteners include from 3–12% fat, 4–10 carbohydrate, 0.75–1.5% protein, 0.2–1.0% emulsifier, 0.1–0.65% stabilizing-/buffering agents, balance water.

A good dry, non-dairy coffee whitener formulation is one which, on reconstitution in coffee, forms a stable fat emulsion wherein the particle size of the fat or oil in the emulsion is about 1–3 microns in diameter. This provides a whitening effect, produced primarily as a result of light reflected from the surface of the finely emulsified fat globules. The carbohydrate, typically a corn syrup solid, acts as a carrier for the fat to retard coalescence of the fat and provides some sweetness effect. Emulsifiers, such as mono- and diglycerides are incorporated in the formulation to maintain the fat globules in dispersion. The protein, which almost invariably is sodium caseinate, has been found to be necessary to stabilize the emulsion through the drying step so that when the dried product is reconstituted in coffee, a stable emulsion is provided. The protein encapsulates the oil or fat droplets and binds water, thus preventing separation of the fat and coalescence of the droplets to form undesirable fat globules on the surface of the hot coffee. Sodium caseinate, however, has its problems--casein is milk derived and becoming expensive and sodium caseinate, while legally defined to be a non-dairy material, may make the product unacceptable to some ethnic groups. Unfortunately, the several attempts to replace sodium caseinate with other water dispersible proteins such as soy protein, have all been less than satisfactory. This is due to off-flavors, feathering of the protein in coffee, fat separation, poor whitening properties, and other problems. It is also common to include in the product stabilizing/buffering salts such as dipotassium phosphate, disodium phosphate, sodium citrate, tetrasodium pyrophosphates, ets., to improve the colloidal dispersibility of the protein and prevent what is termed "protein feathering" or precipitation of the protein due to acidity of the drink to which the whitener is added.

The fat or oil which is used is preferably bland or neutral in flavor and has, particularly for a spray dried product, long term stability against oxidation and the development of rancidity. For this purpose, fats which are highly saturated have been preferred. In addition, the fat must have a sufficiently high solids content at storage and/or handling temperature for the fat to remain in a solid state during storage and/or handling. At the same time the solids content of the fat should be sufficiently low to avoid leaving a waxy mouth-feel when used in coffee. In order to meet these criteria it has become conventional to employ a hydrogenated lauric-containing fat which is solid at room temperature, most usually coconut oil.

Notwithstanding that non-dairy coffee whiteners contain no cholesterol, their content of highly saturated fats, such as coconut oil, presents the same sort of dietary dilemma as the high cholesterol levels of high butterfat creamers such as half & half. High saturated fat levels in the blood, like high cholesterol levels in the blood, increase the risk of heart disease. Thus, to the extent that the dietary intake of high cholesterol or high saturated fat-containing foods may be a cause of high cholesterol or high saturated fat levels in the blood, and this connection has yet to be conclusively established, the risk of heart disease should be reduced by reducing the intake of foods high in butterfat or saturated fat. However, the switch from butterfat-containing coffee whiteners to coconut oil-containing coffee whiteners accomplishes a reduction in dietary cholesterol only at the expense of an increase in dietary saturated fat levels and with no apparent reduction in the risk of heart disease. Indeed, it is believed by some that decreasing caloric intake while maintaining protein and carbohydrate intake is as effective as anything else in decreasing the risk of heart disease.

It is, therefore, the purpose of the present invention to avoid the cholesterol for saturated fat trade-off between half & half and non-dairy whiteners and provide a new and aesthetically pleasing fluid, dairy coffee whitener having the appearance, taste, body, mouth feel and whitening ability of high butterfat-containing dairy creamers yet which has a negligible saturated fat content, an insignificantly low cholesterol content and less than half the calorie content per serving of either high butterfat or non-dairy whiteners. The result is an effective coffee whitener, despite the absence of oils and fats, which is aesthetically pleasing, minimizes the risk of heart disease and is attractive to calorie conscious dieters

DISCLOSURE OF THE INVENTION

In one aspect of the present invention this is accomplished by providing a fluid, dairy coffee whitener which resembles conventional high butterfat content coffee creamers in appearance, taste and mouth feel, but which has a butterfat content substantially below that of known fluid, dairy coffee creamers.

In another aspect of the present invention this is accomplished by providing a fluid, dairy coffee whitener which is aesthetically pleasing and effective in whitening and mellowing coffee yet which contributes negligible levels of saturated fat and cholesterol to the dietary intake of the coffee drinker.

In still another aspect of the present invention there is provided a fluid, dairy coffee whitener which is sufficiently low in butterfat content and calories to be included as a desirable component of a reducing diet.

In yet another aspect of the present invention a fluid, dairy coffee whitener is provided which has the appearance, taste and creamy mouth feel of high butterfat coffee creamers, effectively whitens and mellows coffee employing relatively small coffee whitener serving sizes and contributes negligible saturated fat and cholesterol to the diet, but which has a butterfat content not exceeding 1.0% by weight, desirably less than 0.4% by weight, of the final product and a calorie content of less than about ten calories per serving.

In still another aspect of the present invention there is provided a method for making a very low butterfat content, low calorie, fluid, dairy coffee whitener.

BEST MODE FOR CARRYING OUT THE INVENTION

The present invention relates to a fluid, low butterfat-containing coffee whitener dairy product which resembles conventional high butterfat content coffee creamers in appearance, taste and mouth feel, but which has negligible fat content and a calorie content substantially reduced below that of conventional dairy or non-dairy coffee whiteners. As a result, the coffee whitener of the present invention is low in cholesterol and saturated fats and therefore presents no health risk in the diet. In addition, it is suitable for inclusion in the diet of persons for whom a reduced intake of fat or calories is necessary or desirable. The coffee whitener product of the present invention typically contains 1.0% or less, preferably 0.4% or less, by weight of fat; 8-12%, preferably about 10%, by weight of protein; and 8-12%, preferably about 10%, by weight of carbohydrate. A recommended ⅜ fluid ounce (11.09 ml) serving of the whitener contains less than about 10 calories.

The process by which the fluid, dairy coffee whitener of the present invention is made involves admixing very low fat milk, nonfat dry milk solids, a fat and protein emulsifier, and a whitening agent; homogenizing the resulting mixture by conventional homogenizing means; pasteurizing the mixture by the ultra high temperature, short time method; cooling the mixture to a temperature not exceeding 50° F. (10° C.); and packaging the coffee whitener product in single serving, or larger, containers.

To prepare a fluid coffee whitener from a very low fat milk, particularly from a skim milk having a butterfat content not greater than about 0.4% by weight, presents very fundamental problems in terms of providing an aesthetically pleasing product which can effectively whiten and mellow coffee when used in reasonably small serving sizes. Conventional dairy (half & half) and non-dairy creamers contain very high fat contents (butterfat, coconut oil) which provide the necessary whitening effect as a result of light reflected from the surface of finely emulsified fat globules. In the absence of such large amounts of fat and with the limitations imposed by FDA on the quantity of food coloring, e.g., whitening, agents which may be used, the provision of adequate coffee whitening capability is a problem which is unique to the present negligibly low fat coffee whitener products. In addition, it is well known that the conventional skim milk of commerce is a watery, blueish colored liquid which has neither the appearance nor creamy mouth feel of high butterfat coffee creamers. Thus, the provision of a negligibly low fat coffee whitener having the appearance, taste and mouth feel of conventional dairy creamers is another problem which is unique to the present negligibly low fat coffee whitener products. These problems and others are overcome by the coffee whitener of the present invention which comprises a very low butterfat content (preferably 0.4% by weight or less), fluid, dairy product which is relatively high in dispersible protein and which includes emulsifying and whitening agents, as required, to emulsify the protein and whatever small amount of fat may be present and to enhance the whitening ability of small serving sizes of the product.

In order to prepare a fluid, dairy coffee whitener having a butterfat content no greater than 0.4% by weight of the use of fat contributing ingredients must be carefully controlled. Inasmuch as the primary fat contributing ingredient in the present coffee whitener is milk, a low fat content may be achieved by selecting a skim milk with a butterfat content of not more than about 0.4% by weight, preferably less than about 0.2% by weight and, most desirably, less than about 0.1% by weight for use in the method and product of the present invention. The term "milk" as used herein means the conventional milk of commerce (butterfat content ranging from about 0.1% to 3.5% by weight) as well as equivalent compositions formed by suitable admixtures of milk solids and water.

In preparing the preferred low calorie, low fat, fluid, dairy coffee whitener of the present invention, skim milk having a fat content of not more than about 0.4% by weight, preferably less than about 0.2% by weight, is placed in a stainless steel mixing vat or like container. At this point, the skim milk may be either unpasteurized or already pasteurized. To the skim milk are added emulsifiers, whitening agents and nonfat dry milk solids. A preferred emulsifier which has been found to be successful is mono-diglycerides. However, other commonly used commercially available dairy emulsifiers could also be utilized, either alone or in combination. A preferred whitening agent is food grade, purified titanium dioxide. The preferred nonfat dry milk solids in order to achieve the low fat and low calorie levels of the coffee whitener of the present invention yet prepare a product having a creamy consumer acceptable appearance and mouth feel, rather than the loose and watery consistency typical of low fat skim milk, are desirably of the specially heat modified type. Such a modified milk solids product is commercially available from a number of manufacturers. Exemplary of suitable products are "PMC" available from Pro-Mark Co. of Tulsa, Okla., "Hi-Sorb" available from MPI Division of Stauffer Chemical Company, Inc., and "Crest-Lac" available from Crest Foods Co., Inc., of Ashton, Ill. Each of these products is a grade-A conventional nonfat dry milk product which has been modified primarily by heat for the purpose of increasing the hydration of the protein and for making the product more effective in transmitting texture and flavor. See, for example, U.S. Pat. No. 4,096,287, the disclosure of which is incorporated herein by reference, for a discussion of acceptable methods for preparing the specially heat modified nonfat dry milk product including the essential step of non-coagulative direct steam heating of condensed skim milk prior to spray drying for modifying the milk protein. However, it should be appreciated that a consumer acceptable coffee whitener having low fat and low calorie levels and exhibiting a consumer acceptable appearance and mouth feel can also be made using conventional nonfat dry milk solids. It has been found convenient to premix the emulsifier, whitening agent and nonfat dry milk solids in the amounts normally used for production so that the nonfat dry milk solids serve as a carrier for the other ingredients. In this connection, as previously indicated, it is acceptable to use admixtures of nonfat dry milk solids and water in lieu of the skim milk in the process of the present invention. If this is done, preparation of the milk starting ingredient must be consistent with the desired 18-25% by weight, preferably about 20% by weight, total solids in the final product.

The preferred coffee whitener of the present invention includes a low fat fluid milk component, desirably comprising skim milk, specially heat modified nonfat milk solids and, optionally, a very small quantity of relatively high butterfat content, about 30% by weight, cream. The fluid milk component comprises at least 95% by weight, desirably 98-99% by weight, of the fluid, dairy coffee whitener product. Approximately 80-87% by weight of the fluid milk component, preferably about 85% by weight, is the very low butterfat-containing skim milk. The balance, about 13-20% of weight, preferably about 15% by weight, comprises the specially heat modified nonfat milk solids. If desired in formulating the product, up to 0.3% by weight of the fluid milk component can be an about 30% by weight butterfat-containing cream. The additional cream ingredient, if included, must be consistent with the 0.4% maximum butterfat and 18-25% solids limitations on the preferred fluid coffee whitener product and is believed to improve the whitening ability of the product. For obvious reasons, a corresponding larger amount of a lesser butterfat content cream would accomplish comparable results. All of the fat, calories, protein and carbohydrate in the coffee whitener product of the present invention are contributed by the fluid milk component thereof.

The balance of the coffee whitener (1-5% by weight) is a whitening component consisting of an emulsifier and varying quantities of a whitening agent. A major proportion of the whitening component is the emulsifier which is present in an amount sufficient to emulsify the protein and fat content of the fluid milk component into highly dispersed protein miscelles and fat globules. It is the relatively large quantity of protein in the present coffee whitener, desirably about 10% by weight, compared, for example, with 0.75-1.5% protein in typical liquid non-dairy coffee whiteners, which when highly dispersed as finely divided micelles contributes significantly to the high whitening ability of the product of the present invention. Typically, the emulsifying amount of emulsifier to achieve the desired highly dispersed micelles and globules is 90% by weight or more of the whitening component. The preferred emulsifiers are bland, food grade monodiglycerides derived from vegetable fats and oils. Most preferred is a hard monodiglyceride such as is available under the trademark DUR-EM 117 from SCM Corporation of Cleveland, Ohio. DUR-EM 117 is a white bead or flake having 40% minimum alpha monoglycerides, an IV of about 5, and a Capillary Melting Point (CMP) of 140°–150° F. (60°–65.6° C.). Also useful are the soft mono-diglycerides which are plastic in consistency. Suitable soft mono-diglyceride emulsifiers are also available from SCM Corporation under the trademark DUR-EM. For example, DUR-EM 114 has 40% minimum alpha monoglycerides, an IV of 65-75 and a CMP of 110°–120° F. (43.3°–48.9° C.). DUR-EM 204 has a monoglyceride content of at least 52%, an IV of 65-75 and a CMP of 114°–121° F. (45.6°–49.4° C.). Also useful is DUR-EM 207 which has a monoglyceride content of 52%, an IV of 5 and a CMP of 140°–146° F. (60°–63.3° C.). The balance of the whitening component, typically 10% by weight in the preferred form of the invention, is an FDA approved, food grade whitening agent which is present in an amount sufficient, together with the whitening effect of the highly dispersed fat and protein, to whiten coffee to an aesthetically pleasing extent using serving sizes not exceeding ½ fluid ounce (14.78 ml), preferably ⅜ fluid ounce (11.09 ml). The preferred food grade whitening agent for this purpose is water dispersible titanium dioxide, available commercially as 3330 Titanium Dioxide from Whittaker, Clark & Daniels, Inc., of South Plainfield, N.J. This compound is not only effective to supplement the whitening effect of the dispersed protein micelles in the coffee but also contributes to the excellent feathering resistance exhibited by the coffee whitener of the present invention. In those forms of the invention which utilize a low fat fluid milk component having a butterfat content in the range 0.4%–1% by weight, the amount of food grade whitening agent employed may be reduced. The increased butterfat content contributes significantly to the whitening ability of the coffee whitener of the present invention and effectively supplements the whitening effect of the dispersed protein micelles and food grade whitening agent. Surprisingly, it has been found that increasing the butterfat content of the coffee whitener product up to 1% only very negligibly increases the calorie and cholesterol content per serving of the present invention.

The skim milk-nonfat dry milk solids-emulsifier-whitening agent mixture is well mixed to assure a thorough blending of the ingredients. The mixture is then homogenized by conventional homogenization means at about 1200-3000 psig (84.36-210.9 kg/cm²), after which it is pasteurized by the ultra high temperature, short time method at temperatures in the range 280°–285° F. (137.8°–140.6° C.) for about 2 seconds or less to avoid carmelization. In addition to enhancing the shelf stability of the product, this heat treatment denatures the milk protein, causing water in the mixture to be absorbed and helps to create a thicker, richer product having a more aesthetically pleasing mouth feel. The homogenized, pasteurized mixture is cooled by passage over water-cooled plates to a temperature of about 50° F. (10° C.) or below, preferably 38°–45° F. (3.3°–7.2° C.). Depending upon the intended end use of the coffee whitener product it may be packaged in ⅜ fluid ounce (11.09 ml) single serving, half pint (236.59 ml), pint (473.18 ml), quart (946.35 ml), or other convenient size, containers. Desirably, the packaged product is maintained at refrigeration temperatures, 38°–45° F. (3.3°–7.2° C.), at which temperatures the flavor of the product is enhanced.

The following example illustrates the preparation of a typical coffee whitener in accordance with the present invention and is intended to exemplify and not to limit in any respect the content and scope thereof.

EXAMPLE 2300 pounds (1035 kg) of a HTST pasteurized skim milk having a butterfat content of about 0.2% by weight, 400 pounds (180 kg) of heat modified nonfat dry milk solids (PMC brand obtained from The Pro-Mark Companies of Tulsa, Okla.), 19.6 pounds (8.82 kg) mono-diglyceride emulsifier (DUR-EM 117 brand obtained from SCM Corporation of Cleveland, Ohio) and 1.4 pounds (0.63 kg) of FDA approved titanium dioxide coloring agent (3300 Titanium Dioxide obtained from Whitaker, Clark & Daniels, Inc., of South Plainfield, N.J.) were placed in a stainless steel vat equipped with an agitator. The resulting mixture was thoroughly blended and homogenized at about 2000–2500 psig (140.06–175.21 kg/cm². The homogenized mixture was then pasteurized by the ultra high temperature method at 283° F. (139.4° C.) for 2 seconds, after which the pasteurized mixture was passed over water cooled plates to reduce the temperature to about 50° F. (10° C.). At this temperature the coffee whitener product was packaged into ⅜ fluid ounce (11.09 ml) single serving containers, half pint (236.59 ml), pint (473.18 ml) and quart (946.35 ml) containers. The containers were refrigerated at normal refrigeration temperatures of 38°–45° F. (3.3°–7.2° C.) and maintained under refrigeration until used. The refrigerated product remained stable and useful for at least 90 days. Unrefrigerated, the product evidenced a useful life of at least 30 days.

The coffee whitener product prepared in this manner had a butterfat content of 0.2% by weight, an approximately 10% by weight protein level, an approximately 10% by weight carbohydrate content, a sodium content of only 0.12%, a solids content of 19% and a calorie content of 10 calories per ⅜ fluid ounce (11.09 ml) serving.

INDUSTRIAL APPLICABILITY

The fluid, dairy coffee whitener of the present invention is widely useful to satisfy the aesthetic desires of those coffee drinkers who prefer real dairy creamers while, at the same time, allaying the fears of those who believe that the dietary intake of high cholesterol, high saturated fat foods leads to correspondingly high levels of cholesterol and saturated fats in the bloodstream and, ultimately, to an increased risk of heart disease. It is also a valuable and highly desirable product for coffee drinking calorie conscious dieters who have found that, notwithstanding their taste preferences, the high calorie contents of both half & half and non-dairy coffee whiteners, about 20–22 calories/serving, is too high a calorie price to pay for whitened coffee. By contrast, the relatively low calorie content less than 10 calories/serving for the coffee whitener, of the present invention represents better than a 50% reduction in calorie intake.

The following chart compares the butterfat (BF) contents (% by weight), cholesterol (CLSTRL) levels (mg. per recommended serving size), total fat (TF) and saturated fat (SF) contents (g. per recommended serving size) and calorie (CAL) content (calories per recommended serving size) of half & half, typical liquid non-dairy coffee whiteners, typical powdered non-dairy coffee whiteners and the fluid, dairy coffee whitener of the present invention.

| PRODUCT | BF | CLSTRL | TF | SF | CAL |
|---|---|---|---|---|---|
| Half & Half* | 11 | 5.18 | 1.61 | 1.002 | 20–22 |
| Liquid Non-Dairy* | 0 | 0 | 1.39 | 1.302 | 20–22 |
| Powdered Non-Dairy** | 0 | 0 | 1.77 | 1.626 | 20–22 |
| Present Invention+ | 0.4 | 0.50 | .042 | .017 | 9.3 |
| Present Invention+ | 1.0 | 0.55 | .106 | .030 | 9.8 |

*recommended serving size is ½ fl. ounce (14.287 ml)
**recommended serving size is 1 teaspoon
+recommended serving size is ⅜ fl. ounce (11.09 ml)

It will be appreciated from the chart that the fluid, dairy coffee whitener of the present invention has negligible butterfat and cholesterol levels (by contrast with the undesirably high levels present in half & half) and negligible total fat and saturated fat levels (by contrast with the undesirably high levels present in both liquid and powdered non-dairy coffee whiteners and in half & half). It will also be appreciated that the coffee whitener of the present invention reduces by more than half the number of calories contributed to the diet by coffee whiteners.

What is claimed is:

1. A non-stabilized, fluid, dairy coffee whitener composition which exhibits the organoleptic properties of conventional dairy creamers comprising, as major ingredients, a butterfat-containing milk product in sufficient amount to provide a butterfat content in said coffee whitener composition not exceeding 1.0% by weight and nonfat dry milk, and including an emulsifier in an amount sufficient to disperse milk protein contributed to said composition by said milk product and said nonfat dry milk into finely divided protein micelles, said coffee whitener composition having a total solids content of 18–25% by weight, a protein content of 8–12% by weight, and total fat, saturated fat, cholesterol and calorie contents substantially below the corresponding contents of conventional half and half dairy creamers.

2. A coffee whitener composition, as claimed in claim 1, wherein said milk product comprises low fat milk having a butterfat content not exceeding 1.0% by weight.

3. A coffee whitener composition, as claimed in claim 2, wherein said nonfat dry milk is heat modified nonfat dry milk.

4. A coffee whitener composition, as claimed in claim 1, 2 or 3, wherein said composition includes only a negligibly small content of cholesterol, total fat and saturated fat.

5. A coffee whitener composition, as claimed in claim 3 or 2, wherein said emulsifier is a mono-diglyceride.

6. A coffee whitener composition, as claimed in claim 3 or 2, further including a whitening agent for enhancing the whitening effect of said composition.

7. A coffee whitener composition, as claimed in claims 2 or 3, wherein said lowfat milk is skim milk having a butterfat content not exceeding 0.4% by weight, said composition including a whitening agent for enhancing the whitening effect thereof.

8. A coffee whitener composition, as claimed in claim 7, wherein said emulsifier is a mono-diglyceride.

9. A coffee whitener composition, as claimed in claim 7, wherein said whitening agent is food grade titanium dioxide.

10. A coffee whitener composition, as claimed in claim 7, wherein said skim milk has a butterfat content of less than about 0.2% by weight.

11. A coffee whitener composition, as claimed in claim 10, wherein said skim milk has a butterfat content of less than about 0.1% by weight.

12. A coffee whitener composition, as claimed in claim 7, wherein said skim milk and nonfat dry milk comprise at least 95% by weight of said composition.

13. A coffee whitener composition, as claimed in claim 7, having a calorie content of less than about 10 calories per ⅜ fluid ounce serving.

14. A coffee whitener composition, as claimed in claim 7, wherein said emulsifier is a mono-diglyceride and said whitening agent is food grade titanium dioxide, said composition having a calorie content of about 10 calories per ⅜ fluid ounce serving.

15. A method for making a non-stabilized, substantially fat and cholesterol free, low calorie, fluid, dairy coffee whitener composition which exhibits the organoleptic properties of conventional dairy creamers comprising the steps of:
(a) admixing sufficient of a butterfat-containing milk product to provide a butterfat content in said coffee whitener composition not exceeding 1% by weight, an amount of nonfat dry milk effective to improve appearance, taste and mouth feel, and an emulsifier in an amount sufficient to disperse the milk protein into finely divided protein micelles, the amounts of milk product, nonfat dry milk and emulsifier being selected to prepare a whitener composition having a total solids content of 18–25% by weight and a protein content of 8–10% by weight;
(b) homogenizing said mixture at pressures in the range 1200–3000 psig (84.36–210.9 kg/cm$^2$);
(c) pasteurizing said homogenized mixture at temperatures in the range of 280°–285° F. (137.8°–140.6° C.) for not more than about 2 seconds;
(d) cooling said pasteurized and homogenized mixture to a temperature not exceeding 50° F. (10° C.); and
(e) packaging said cooled mixture.

16. A method, as claimed in claim 15, wherein said milk product comprises low fat milk having a butterfat content not exceeding 1.0% by weight.

17. A method, as claimed in claim 16, wherein said nonfat dry milk is heat modified nonfat dry milk.

18. A method, as claimed in claims 16 or 17, including the step of admixing with said low fat milk, nonfat dry milk and emulsifier a sufficient amount of a whitening agent for enhancing the whitening effect of the composition.

19. A method, as claimed in claim 18, wherein said low fat milk is skim milk having a butterfat content not exceeding 0.4% by weight.

20. A method, as claimed in claim 19, wherein said skim milk has a butterfat content of less than about 0.2% by weight.

21. A method, as claimed in claim 19, wherein said skim milk has a butterfat content of less than about 0.1% by weight.

22. A method, as claimed in claim 19, wherein said homogenizing pressure is from 2000 to 2500 psig (140.06–175.21 kg/cm$^2$).

* * * * *